United States Patent [19]
Buchanan et al.

[11] Patent Number: 5,941,397
[45] Date of Patent: Aug. 24, 1999

[54] BICYCLE HOLDER

[75] Inventors: Robert L. Buchanan; Mark A. Buchanan, both of Indianapolis, Ind.; Terrance Willaman, Cochranton, Pa.

[73] Assignee: BoMar Industries, Inc., Indianapolis, Ind.

[21] Appl. No.: 08/583,715

[22] Filed: Jan. 5, 1996

[51] Int. Cl.⁶ .................................................. A47F 7/00
[52] U.S. Cl. ............................................................. 211/19
[58] Field of Search .................................. 211/17, 18, 19, 211/20, 23, 65, 70.5, 87.01, 89.01

[56] References Cited

U.S. PATENT DOCUMENTS

| | | | |
|---|---|---|---|
| 572,770 | 12/1896 | Putnam | 211/19 |
| 573,171 | 12/1896 | Westphal | 211/19 X |
| 588,542 | 8/1897 | Williams . | |
| 619,344 | 2/1899 | Pyott, Jr. . | |
| 621,819 | 3/1899 | Ivatt . | |
| 633,806 | 9/1899 | Cifka . | |
| 639,517 | 12/1899 | Butcher | 211/19 X |
| 639,991 | 12/1899 | Jewell | 211/19 X |
| 648,234 | 4/1900 | Brown | 211/19 |
| 1,232,501 | 7/1917 | Colen . | |
| 4,171,077 | 10/1979 | Richard, Jr. | 224/42.038 |
| 4,352,432 | 10/1982 | Smith | 211/19 |
| 4,416,379 | 11/1983 | Graber | 211/19 |
| 4,629,104 | 12/1986 | Jacquet | 211/17 X |
| 4,733,810 | 3/1988 | Graber et al. | 211/17 X |
| 4,842,148 | 6/1989 | Bowman | 211/18 |
| 4,934,572 | 6/1990 | Bowman et al. | 211/17 X |
| 5,078,276 | 1/1992 | Rogge et al. | 211/18 |
| 5,082,120 | 1/1992 | Vega | 211/20 |
| 5,086,930 | 2/1992 | Saeks | 211/17 |
| 5,092,504 | 3/1992 | Hannes et al. | 224/42.45 R |
| 5,301,817 | 4/1994 | Merritt | 211/20 X |
| 5,435,475 | 7/1995 | Hudson et al. | 224/546 X |

*Primary Examiner*—Daniel P. Stodola
*Attorney, Agent, or Firm*—Locke Reynolds

[57] ABSTRACT

A holder for a bicycle having a first wheel and a second wheel, each wheel including a rim and a tire. The holder includes a floor supported channel for receiving the first wheel, a wall supported channel situated adjacent to the floor supported channel for receiving the first wheel, a wall supported standard situated above the wall supported channel, and a wheel engaging apparatus connected to the wall supported standard for engaging the second wheel. The wheel engaging apparatus includes a base, a coupling member coupling the base to the wall supported standard, an axis defining member fixed to the base, a pivot member pivotally engaging the axis defining member, a first arm and a second arm, both arms having a proximal portion fixed to the pivot member for pivotal displacement with respect to the base between a wheel engaging position and a wheel releasing position. The first arm includes a distal portion adapted to engage the rim portion of the second wheel and the second arm includes a distal portion adapted to engage the tire of the second wheel when the pivot member is situated in the wheel engaging position. A third arm is fixed to the pivot member for pivotal displacement with respect to the base, and a biasing member is coupled between the third arm and the base for biasing the pivot member toward the wheel engaging position. A release member is rotatably coupled to the pivot member and engagable with at least one of the arms to force pivotal displacement of pivot member toward the wheel releasing position.

14 Claims, 4 Drawing Sheets

BICYCLE HOLDER

BACKGROUND OF THE INVENTION

The present invention is directed to holders for holding light weight cycle vehicles such as bicycles, tricycles, scooters, and the like. The invention is particularly directed to such holders which are adapted for use on a public transportation vehicle such as a train, bus, or the like, to temporarily store a cycle so that the cycle can be quickly retrieved from the holder upon the cycle owner's departure from the public vehicle.

Bicycles and other cycle vehicles provide a very economic mode of transportation as well as an excellent form of recreation and exercise. These factors, as well as others, contributed to a resurgence in the use of bicycles, both as a recreational vehicle and as a commuting vehicle. When used as a commuting vehicle, the bicycle is usually employed only for short distances of a few kilometers or less. For long commuting distances, private automobiles can be used but public transportation such as trains or busses are often preferred by cycle users. While many bicycle carriers have been designed for use with private automobiles, very little attention has been given in recent years to providing cycle carriers for use on public transportation vehicles.

Practical considerations require the space occupied by any cycle holder on a public transportation vehicle be minimized. It is also desirable that any cycle rack or storage area on a public transportation vehicle provide for easy access of the cycle, and particularly quick retrieval of the cycle from the storage area upon arrival at the selected destination. The cycle holder should maintain each cycle separate from adjacent bicycles in a secure manner so the movement of the public transportation vehicle will not dislodge or damage the cycle. Preferably, the cycle holder should not require any disassembly of the bicycle itself, although temporary removal of the front wheel of the bicycle could be employed using quick release hubs which might also contribute to a minimization of the space employed in storing the bicycle. The cycle holder preferably also includes facilities for use of a personal lock to inhibit theft.

SUMMARY OF THE INVENTION

A cycle holder in accordance with the present invention includes a wheel engaging apparatus which comprises a base having an axis defining member. A pivot member pivotally engages the axis defining member. A first arm has a proximal portion fixed to the pivot member for pivotal displacement with respect to the base between an open or wheel releasing position and a closed or wheel retaining position. The first arm includes a distal portion having an end adapted to project through a portion of a wheel of the cycle. This distal portion extends over and engages the rim of the wheel to force the wheel toward engagement with the base when the pivot member is situated in the wheel engaging position. Retaining apparatus retains the pivot member in the wheel engaging position.

The wheel engaging apparatus preferably also comprises a second arm having a proximal portion fixed to the pivot member for pivotal displacement with the first arm. The second arm includes a distal portion having a generally V-shaped segment adapted to engage the tread portion of the tire of the wheel to inhibit lateral displacement of the tire with respect to the base when the pivot member is situated in the wheel engaging position. When the first and second arms are pivoted toward the open, wheel releasing position, the wheel is easily removed from a space existing between the first and second arms.

The retaining apparatus preferably comprises a third arm fixed to the pivot member for pivotal displacement with respect to the base with the pivot member. A biasing member is coupled between the third arm and the base for biasing the pivot member toward the wheel engaging position. The biasing member is preferably in the form of a compression spring having a first end coupled to the base and a second end coupled to the third arm. The ends of the biasing member are connected to the base and the third arm such that the pivotal movement of the third arm between the wheel engaging position and the wheel releasing position causes the compression spring to pass through an over-center position. The presence of the intermediate over-center position allows the wheel engaging apparatus to have two stable positions, namely, the wheel releasing position and the wheel engaging position.

In a preferred embodiment, the first pivot arm which overlies the rim of the wheel includes a conformable member covering those portions of the arm which would contact the rim to inhibit abrasion. The compression biasing member preferably comprises a gas spring which insures quiet and safe operation of the wheel engaging apparatus. A release apparatus is provided to engage one of the arms to force pivotal displacement of the pivot member toward the wheel releasing position. The release member preferably includes an elongated handle providing an adequate mechanical advantage to allow an easy manual override of the bias exerted by the biasing member.

The wheel engaging apparatus of the present invention is preferably employed with a standard fixed to a wall of a storage area such as in a public transportation vehicle. The standard can be in the form of one or more U-shaped channels in which the wheel engaging apparatus is longitudinally movable to permit accommodation of bicycles of various sizes. A scale calibrated in standard bicycle sizes can be situated adjacent to the wall supported standard, while a pointer element, fixed to the base, projects toward the scale to permit quick adjustment of the cycle holder to a suitable size prior to engagement of the cycle with the holder.

One feature of the preferred embodiment of the present invention is the vertical storage of the cycle in the holder which has the advantage of minimizing the space occupied. Another feature of the preferred embodiment of the present invention is the side-by-side storage of the cycles which has the advantage of providing easy access to the cycles. Yet another advantage of the preferred embodiment of the present invention is the release of the bicycle from the holder using a simple upward motion of a single handle which has the advantage of providing quick retrieval of the cycle from the storage area upon arrival of the public transportation vehicle at the selected destination. Still another feature of the preferred embodiment of the present invention is the presence of first and second arms which act together to maintain each cycle separate from adjacent bicycles in a secure manner which advantageously prevents damage to the cycle as a result of any movement of the public transportation vehicle.

These and other features and advantages of the present invention will become apparent to those skilled in the art upon consideration of the following description of a preferred embodiment of the invention. The description refers to the accompanying figures.

DESCRIPTION OF A PREFERRED EMBODIMENT

Figure 1:
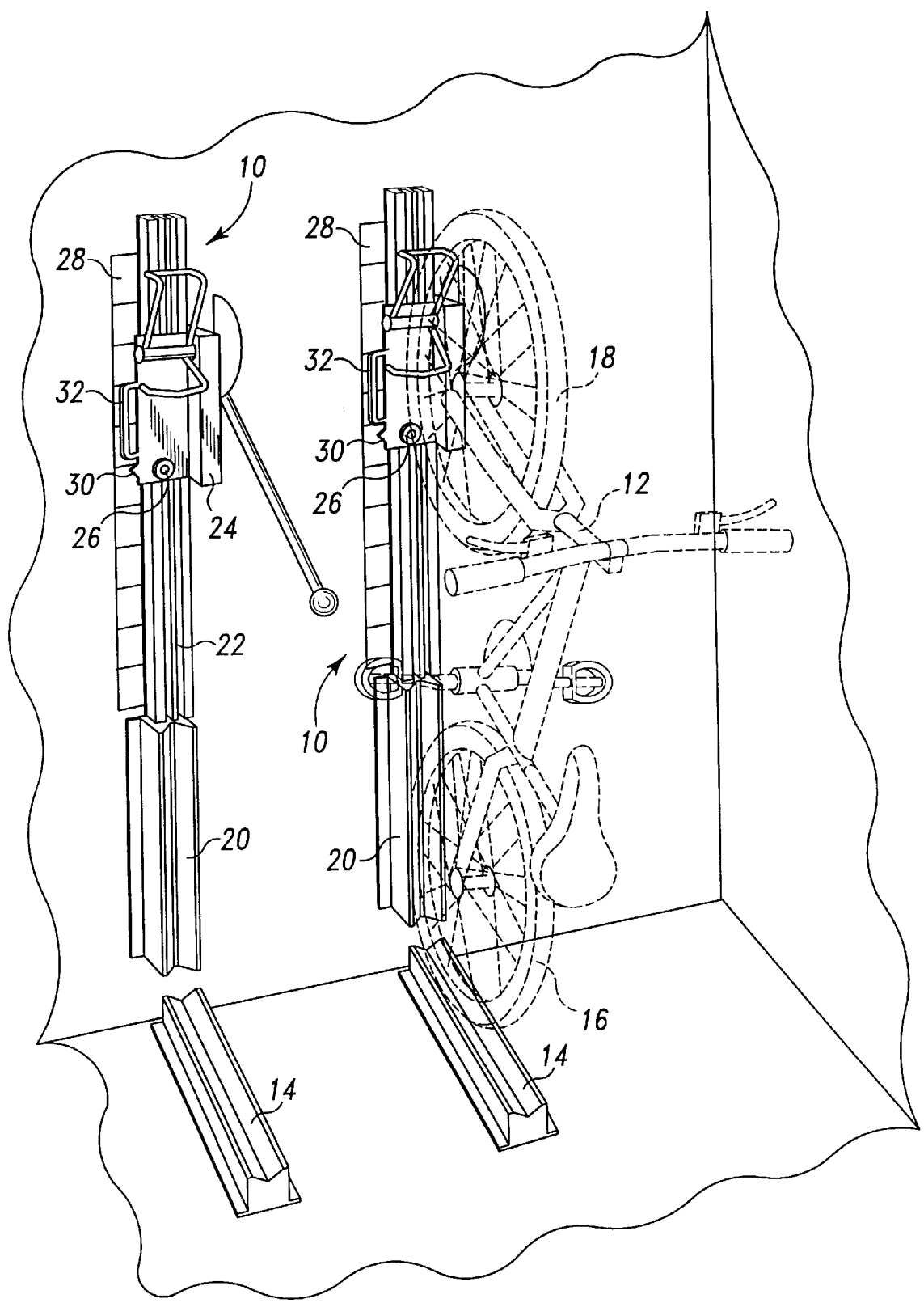
FIG. 1 is a perspective view of a pair of bicycle holders in accordance with the present invention, one of which is holding a bicycle in a preferred manner.
Figure 2:
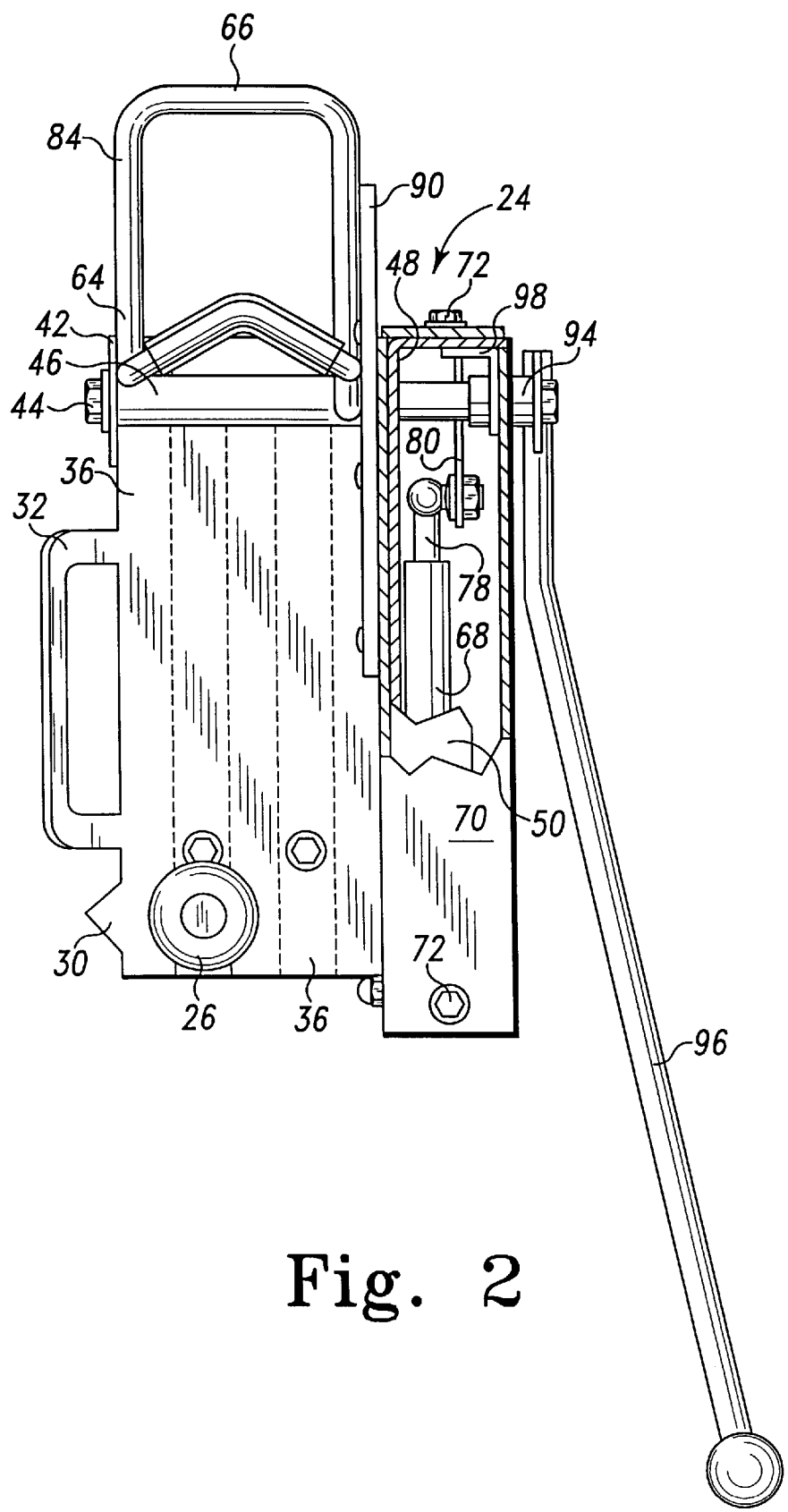
FIG. 2 is a front alevational plan view of the wheel engaging apparatus of the bicycle holder.
Figure 3:
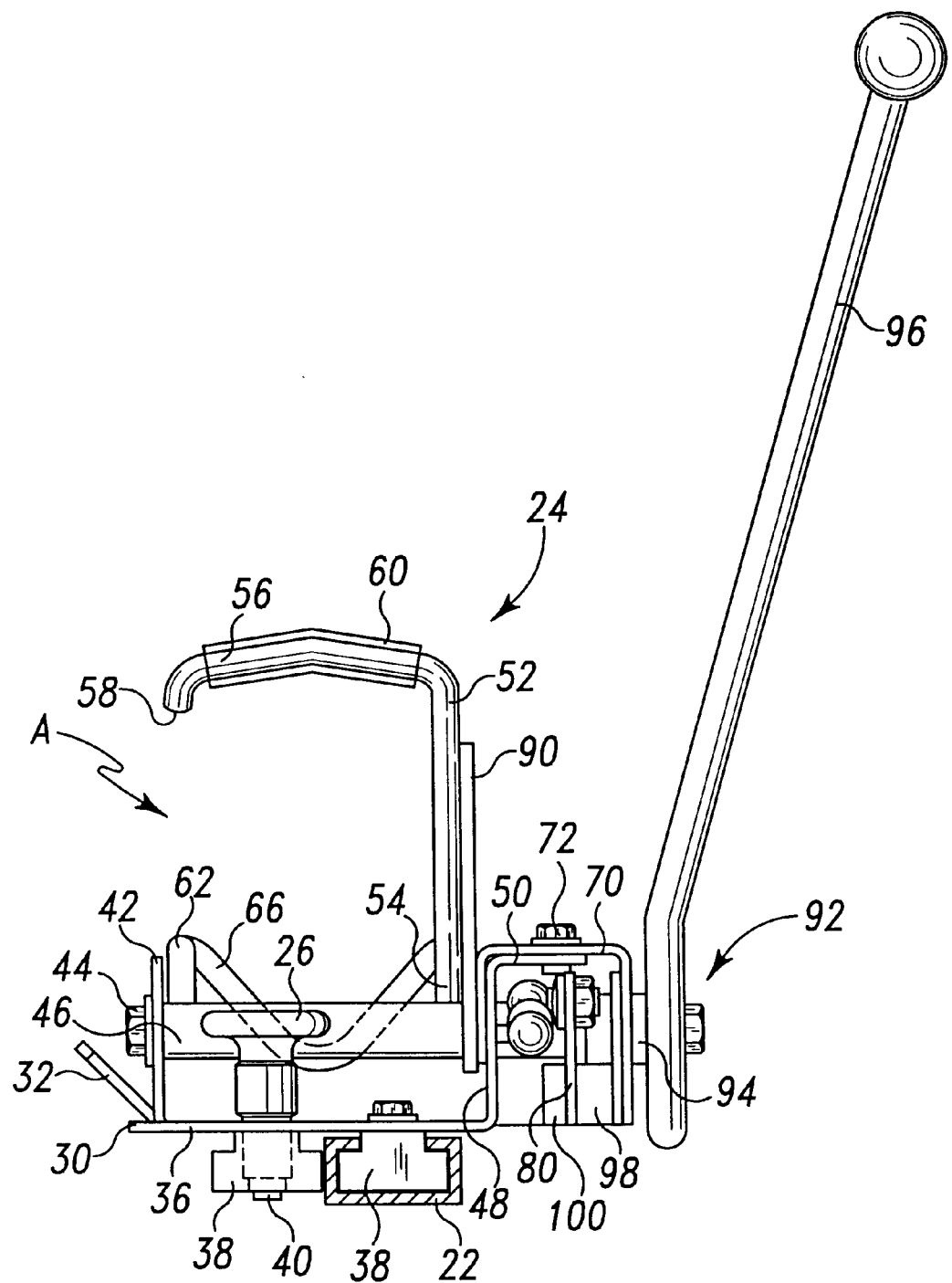
FIG. 3 is an bottom plan view of the wheel engaging apparatus viewed from the bottom of FIG. 2.

A bicycle holder 10 in accordance with the present invention as shown in FIG. 1 holding a bicycle 12. The holder 10 includes a floor supported channel 14 adapted to receive one of the wheels 16 of the bicycle. In the illustrated embodiment, the holder also includes a wall supported channel 20 which also receives the first wheel 16. A wall supported standard 22 is fixed to the wall above the wall supported channel 20. The wall supported standard 22 is preferably in the form of a pair of U-shaped channels positioned immediately adjacent to each other thus forming tracks adapted to receive a vertically adjustable wheel engaging apparatus 24.

The wheel engaging apparatus 24 is preferably vertically adjustable by release of a spring loaded catch 26 which engages standard 22 at certain pre-selected positions. A calibrated gauge or scale 28 can be provided adjacent to the standard preferably calibrated to indicate certain standard bicycle sizes. A pointer element 30 fixed to the wheel engaging apparatus 24 projects toward the scale 28 to indicate the bicycle size selected. A handle 32 fixed to the wheel engaging apparatus permits easy vertical movement of the apparatus 24 when the spring catch 26 is released. Once the appropriate size of bicycle is selected, the spring catch 26 is released and a lower end of the catch is received in an opening located in the standard 22. The bicycle is then inserted into the wheel engaging apparatus 24 and, depending on the type of bicycle, the wheel may be of such a width as to overlie the catch 26 to inhibit any further vertical displacement of the wheel engaging apparatus 24 with respect to the standard 22.

Additional details of the structure of the wheel engaging apparatus are disclosed in FIGS. 2 through 5, wherein the wheel engaging apparatus 24 is shown to include a base 36. A pair of inverted T-shaped slides 38 are fixed to the lower surface of the base 36 and are adapted to engage in the U-shaped channels of the wall mounted standard 22. The spring loaded plunger 26 includes a lower end 40 which, in its rest position, projects below the inverted T-shaped slide by a distance sufficient to engage the periodic openings provided in the bottom wall of the channel forming the wall supported standard 22.

The base 36 includes an upwardly projecting tab 42 which includes an aperture adapted to receive a threaded fastener 44 which engages a first end of pivot member 46. The base 36 also includes an upwardly projecting wall 48, the top of which is an outwardly projecting flange 50. The pivot member 46 projects through an opening in wall 48 which together with the opening in tab 42 defines the axis of rotation of pivot member 46.

A first arm 52 includes a proximal portion 54 fixed to pivot member 46 so the arm 52 and pivot member 46 pivot together about the axis X defined by the openings in wall 48 and tab 42. A distal portion 56 of first arm 52 includes an end 58 defining an opening A adapted to receive a wheel, tire and rim so the distal portion 56 overlies the rim of the wheel. A conformable member 60 such as surgical tubing is provided over the distal portion 56 to prevent abrasion between the first arm 52 and the wheel rim.

A second arm 62 includes a proximal portion 64 fixed to pivot member 46 for rotation with the first arm. A distal portion 66 of the second arm 62 is generally V-shaped to contact lateral portions of a wheel tire inserted into an opening A to inhibit lateral displacement of the wheel, particularly as the first and second arms 52 and 62 are rotated in direction B from an open or wheel releasing position shown in FIG. 4 in solid to a closed or wheel engaging position approximated by the phantom representation of the first and second arms 52' and 62' shown in FIG. 4.

A biasing member 68 is provided which biases the pivot member toward the wheel engaging position. The bias member 68 is covered by a cover 70 which is secured to flange 50 of wall 48 by fasteners 72. The biasing member 68 is shown to comprise a gas-filled compression spring 74 comprising a cylinder having a first end 76 fixed to wall 48 and a second end 78 fixed to a third arm 80. In the preferred embodiment, the gas spring applies a force of approximately 12 newtons.

Figure 5:
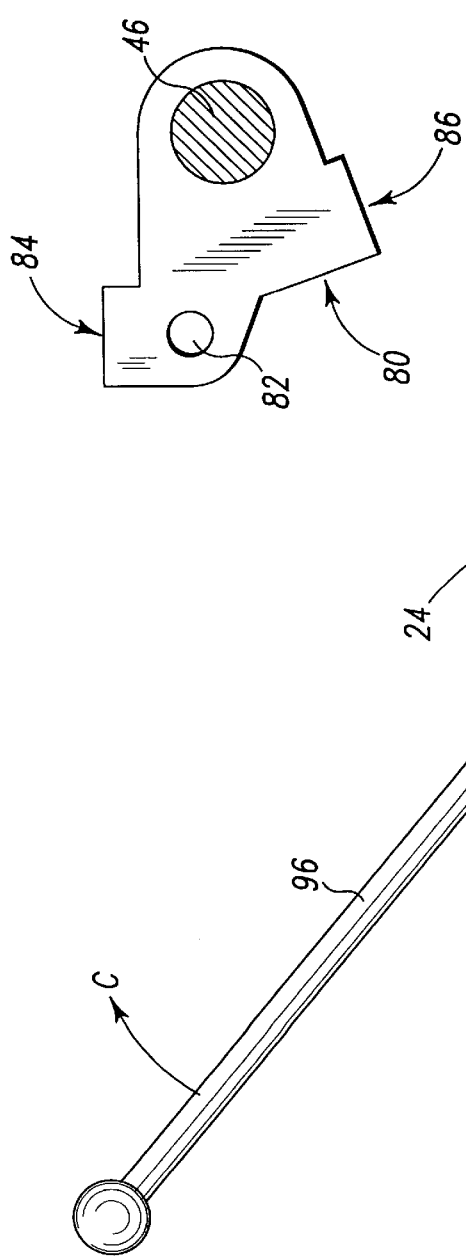
FIG. 5 is an elevation detail view of the third arm which is engaged with the biasing spring.

As shown in detail in FIG. 5, the third arm is fixed to pivot member 46 and includes an opening 82 for receiving a connection to end 78 of gas spring 74. The third arm also includes a first abutting end 84 adapted to abut flange 50 to prevent rotation beyond the release position illustrated in FIG. 4. The third arm 80 also includes a second abutting surface 86 which restrains the third arm and pivot member from traveling significantly beyond the wheel engaging position.

Figure 4:
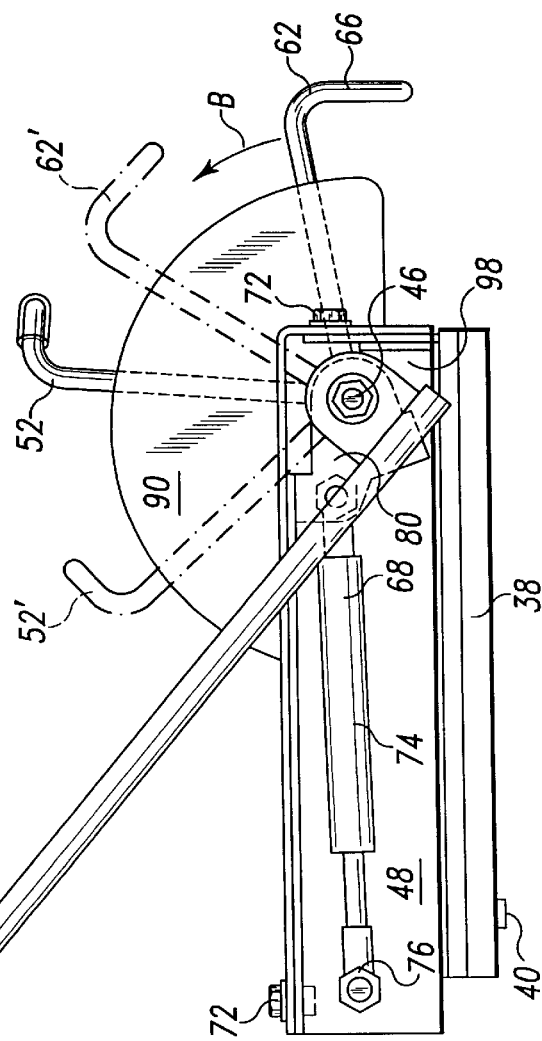
FIG. 4 is a side elevation view of the wheel engaging apparatus taken from the right side of FIGS. 2 and 3.

As best shown in FIG. 4, the opening 82 is situated and positioned above a straight line joining the pivot member 46 to first end 76. In the position shown in FIG. 4, the force applied by the gas spring 74 holds the first and second arms in the open position. As the third arm 80 is rotated with the pivot member from the wheel releasing position to a wheel engaging position, the gas spring 74 passes through the line joining the pivot member 46 and first end 76 which effectively defines an over-center position for the third arm and gas spring arrangement. Further rotational displacement toward the wheel engaging position causes the compressive force of the gas spring to change from resisting the displacement in direction B to encouraging the displacement in direction B thereby biasing the first and second arms toward the wheel engaging position. Once the first and second arms have been rotated to the wheel engaging position, the force applied by the gas spring 74 significantly inhibits any movement of the arms away from the wheel engaging position.

In view of the force applied by the gas spring 74 in the position shown in FIG. 4 to inhibit the first and second arms from rotating in direction B, an intermediate portion 88 of second arm 62 provides a convenient handle for rotating the pivot member as well as the second arms from the open position to the wheel engaging position. It is desirable that the user of the system be protected from any pinching engagement with the device. For this reason, a guard 90 is affixed to wall 48 to prevent manual manipulation of the first and second arms 52 and 62 from the wrong side of the wheel engaging apparatus 24.

To release the bicycle from the wheel engaging apparatus, it is necessary to overcome the force applied by the gas spring 74 when the third arm is rotated to the closed wheel retaining position. This requires the use of a release mechanism. A preferred release mechanism 92 comprises a sleeve 94 received over one end of the pivot member 46 for rotational displacement with respect to the pivot member 46. A handle 96 is fixed to the sleeve which projects outward a distance sufficient to provide significant mechanical advantage to permit a manual override of the bias exerted by the gas spring 74. In a preferred embodiment, the handle is about 60 cm. long.

An L-shaped member 98 is fixed to the sleeve having an end 100 which projects toward wall 48 by a distance sufficient to be engaged by surface 86 of the third arm 80. Thus a rotation of the handle 96 in the direction C causes the L-shaped member, acting on abutting surface 86, to force the third arm to rotate in a direction counter to direction B thereby displacing the pivot member and the first and second arms from the wheel engaging position back to the open or wheel releasing position shown in solid in FIG. 4.

It will be appreciated that, for security purposes, an aperture can be provided in wall 90 to receive a lock which would prevent unwanted theft of a bicycle from the bicycle holder. While the floor support of channel 14 is shown in FIG. 1 to be receiving the rear wheel of bicycle 12, it will be appreciated that the front wheel could also be received in the floor supported channel 14. In an alternative embodiment, the floor supported channel might be replaced by a stand for receiving the front fork 18 of the bicycle with the front wheel removed using quick release hubs leaving only one wheel to be engaged by the bicycle holder. Such temporary removal of the front wheel of the bicycle might also contribute to a further minimization of the space employed in storing the bicycle.

While the present invention has been described in connection with the illustrated embodiment, it will be apparent to those skilled in the art that various changes may be made therein without departing from the spirit or scope of the invention as claimed hereafter.

What is claimed is:

1. A wheel engaging apparatus for engaging a wheel of a vehicle, the wheel including a rim having an inner surface and a tire having an outer surface, the wheel engaging apparatus comprising
a base, axis defining members fixed to the base, a pivot member pivotally engaging the axis defining members, a first arm having a proximal portion fixed to the pivot member for pivotal displacement with respect to the base between a wheel engaging position and a wheel releasing position, the first arm including a distal portion adapted to engage the rim of the wheel to force the wheel into engagement with the base when the pivot member is situated in the wheel engaging position, and retaining apparatus for retaining the pivot member in the wheel engaging position including a third arm fixed to the pivot member for pivotal displacement with respect to the base, and a biasing member coupled between the third arm and the base for biasing the pivot member toward the wheel engaging position.

2. The wheel engaging apparatus of claim 1 further comprising a second arm having a proximal portion fixed to the pivot member for pivotal displacement with respect to the base with the first arm, the second arm including a distal portion having a generally V-shaped segment adapted to engage the tire to inhibit literal displacement of the tire with respect to the base when the pivot member is situated in the wheel engaging position.

3. The wheel engaging apparatus of claim 1 further comprising a release member engagable with at least one of the arms to force pivotal displacement of the pivot member toward the wheel releasing position.

4. The wheel engaging apparatus of claim 3 wherein the release member includes an elongated handle providing a mechanical advantage to allow a manual override of the bias exerted by the biasing member.

5. A wheel engaging apparatus for engaging a spoked wheel of a vehicle, the spoked wheel including a rim having an inner surface and a tire having an outer surface, the wheel engaging apparatus comprising
a base, axis defining members fixed to the base, a pivot member pivotally engaging the axis defining members, a first arm and a second arm, both arms having a proximal portion fixed to the pivot member for pivotal displacement with respect to the base between a wheel engaging position and a wheel releasing position, the first arm including a distal portion adapted to engage the rim of the wheel and the second arm including a distal portion adapted to engage the tire of the wheel when the pivot member is situated in the wheel engaging position, a third arm fixed to the pivot member for pivotal displacement with respect to the base, a biasing member coupled between the third arm and the base for biasing the pivot member toward the wheel engaging position, and a release member engagable with at least one of the arms to force pivotal displacement of the pivot member toward the wheel releasing position.

6. The wheel engaging apparatus of claim 5 wherein the third arm further includes a first stop and a second stop, both stops being positioned to limit pivotal displacement of the third arm.

7. The wheel engaging apparatus of claim 5 wherein the second arm distal portion comprises a generally V-shaped segment adapted to inhibit literal displacement of the tire with respect to the second arm and includes a handle portion situated between the distal and proximal portions to allow manual displacement of the pivot member from the wheel releasing position toward the wheel engaging position.

8. The wheel engaging apparatus of claim 5 wherein the first arm includes an end defining an opening adapted to receive the wheel between the first arm distal portion and the pivot member, the first arm distal portion including a conformable surface to inhibit abrasion of said rim portion of the wheel.

9. The wheel engaging apparatus of claim 5 wherein the biasing member comprises a gas spring having a first end coupled to the base and a second end coupled to the third arm, the pivotal movement of the third arm between the wheel engaging position to the wheel releasing position causing the biasing member to pass through an over center position.

10. The wheel engaging apparatus of claim 5 further comprising a cover situated over the biasing member and a guard plate fixed to the base adjacent to the first arms to inhibit manual contact with the first arm.

11. A holder for holding a bicycle having a first wheel and a second wheel, each wheel generally including a rim and a tire, the holder comprising a floor supported channel for receiving the first wheel, a wall supported channel situated adjacent to the floor supported channel for receiving the first wheel, a wall supported standard situated above the wall supported channel, and a wheel engaging apparatus connected to the wall supported standard for engaging the second wheel, the wheel engaging apparatus comprising
a base, a coupling member coupling the base to the wall supported standard, axis defining members fixed to the base, a pivot member pivotally engaging the axis defining members, a first arm and a second arm, both arms having a proximal portion fixed to the pivot member for pivotal displacement with respect to the base between a wheel engaging position and a wheel releasing position, the first arm including a distal portion adapted to engage the rim portion of the second wheel and the second arm including a distal portion adapted to engage the tire of the second wheel when the pivot member is situated in the wheel engaging position, a third arm fixed to the pivot member for pivotal displacement with respect to the base, a biasing member coupled between the third arm and the base for biasing the pivot member toward the wheel engaging position, and a release member rotatably coupled to the pivot member and engagable with at least one of the arms to force pivotal displacement of pivot member toward the wheel releasing position.

12. The bicycle holder of claim 11 wherein the release member comprises a sleeve received coaxially over the pivot member, a tab fixed to the sleeve to project laterally to engage said third arm, and an elongated handle fixed to the sleeve providing a mechanical advantage to allow a manual override of the bias exerted by the biasing member.

13. The bicycle holder of claim 11 further comprising a scale calibrated in standard bicycle sizes situated adjacent to the wall supported standard, a pointer element fixed to the base and projecting toward the scale, a handle fixed to the base for positioning the base at a selected position on the wall supported standard in relation to the scale, and a securing element for securing the base to the wall supported standard at the selected position.

14. The bicycle holder of claim 11 wherein the wall supported standard comprises a pair of adjacent channel members, each channel member including inwardly directed edges, and wherein the coupling member comprises a pair of inverted T-shaped slides, each slide being longitudinally movably received in one of the adjacent channel members.

* * * * *